US012573924B2

(12) United States Patent
Shirai et al.

(10) Patent No.: US 12,573,924 B2
(45) Date of Patent: Mar. 10, 2026

(54) MANUFACTURING METHOD OF STATOR

(71) Applicant: DENSO CORPORATION, Kariya-city (JP)

(72) Inventors: Nakatsune Shirai, Kariya-city (JP); Yuichi Kudose, Kariya-city (JP); Nobuo Isogai, Kariya-city (JP); Hiroshi Endo, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/741,522

(22) Filed: Jun. 12, 2024

(65) Prior Publication Data

US 2024/0421678 A1     Dec. 19, 2024

(30) Foreign Application Priority Data

Jun. 14, 2023     (JP) ................................. 2023-097684

(51) Int. Cl.
*H02K 15/10*          (2025.01)
(52) U.S. Cl.
CPC ................................. *H02K 15/105* (2013.01)
(58) Field of Classification Search
CPC .... H02K 15/12; H02K 15/121; H02K 15/122; H02K 15/10; H02K 15/105; H02K 3/30
See application file for complete search history.

(56) References Cited

U.S. PATENT DOCUMENTS

| | | | | | |
|---|---|---|---|---|---|
| 3,633,891 | A | * | 1/1972 | Heran | .................... H02K 15/12 |
| | | | | | 156/752 |
| 6,333,573 | B1 | * | 12/2001 | Nakamura | ............... H02K 3/24 |
| | | | | | 310/201 |
| 9,705,372 | B2 | * | 7/2017 | Kurahara | ................. H02K 3/30 |
| 2023/0183414 | A1 | | 6/2023 | Osaka | |

FOREIGN PATENT DOCUMENTS

| | | | |
|---|---|---|---|
| JP | 2004-000893 | A | 1/2004 |
| JP | 5728981 | B | 6/2015 |

* cited by examiner

*Primary Examiner* — Michael P Wieczorek
(74) *Attorney, Agent, or Firm* — Maschoff Brennan

(57)          ABSTRACT

A manufacturing method for a stator includes a first process and a second process. The first process includes: coating a first electrical insulation resin to windings of the stator; and curing the first electrical insulation resin at a temperature(s) higher than a glass transition temperature of the first electrical insulation resin. The second process includes: coating a second electrical insulation resin to the windings after the first process; and curing the second electrical insulation resin at a temperature(s) higher than a glass transition temperature of the second electrical insulation resin. The glass transition temperature of the first electrical insulation resin is higher than the glass transition temperature of the second electrical insulation resin.

4 Claims, 10 Drawing Sheets

MANUFACTURING METHOD OF STATOR

CROSS REFERENCE TO RELATED APPLICATION

This application is based on and incorporates herein by reference Japanese Patent Application No. 2023-97684 filed on Jun. 14, 2023.

TECHNICAL FIELD

The present disclosure relates to a manufacturing method of a stator.

BACKGROUND

Previously, there has been proposed a technique of forming an insulation layer from an electrical insulation resin at a surface layer of respective stator windings of a stator for a rotary electric machine. Specifically, there has been proposed a technique of forming the insulation layer from a varnish which is an electrical insulation resin to increase an adhering strength of the stator windings relative to a stator core of the stator. Also, there has been proposed a technique of forming the insulation layer from a powder resin which is an electrical insulation resin to electrically insulate, for example, welding sections of the stator windings.

SUMMARY

According to the present disclosure, there is provided a manufacturing method of a stator, the manufacturing method including:

a first process that includes:

coating a first electrical insulation resin to a plurality of windings of the stator; and then curing the first electrical insulation resin at a temperature or temperatures higher than a glass transition temperature of the first electrical insulation resin; and a second process that includes:

coating a second electrical insulation resin to the plurality of windings after the first process; and then curing the second electrical insulation resin at a temperature or temperatures higher than a glass transition temperature of the second electrical insulation resin, wherein the glass transition temperature of the first electrical insulation resin is higher than the glass transition temperature of the second electrical insulation resin.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
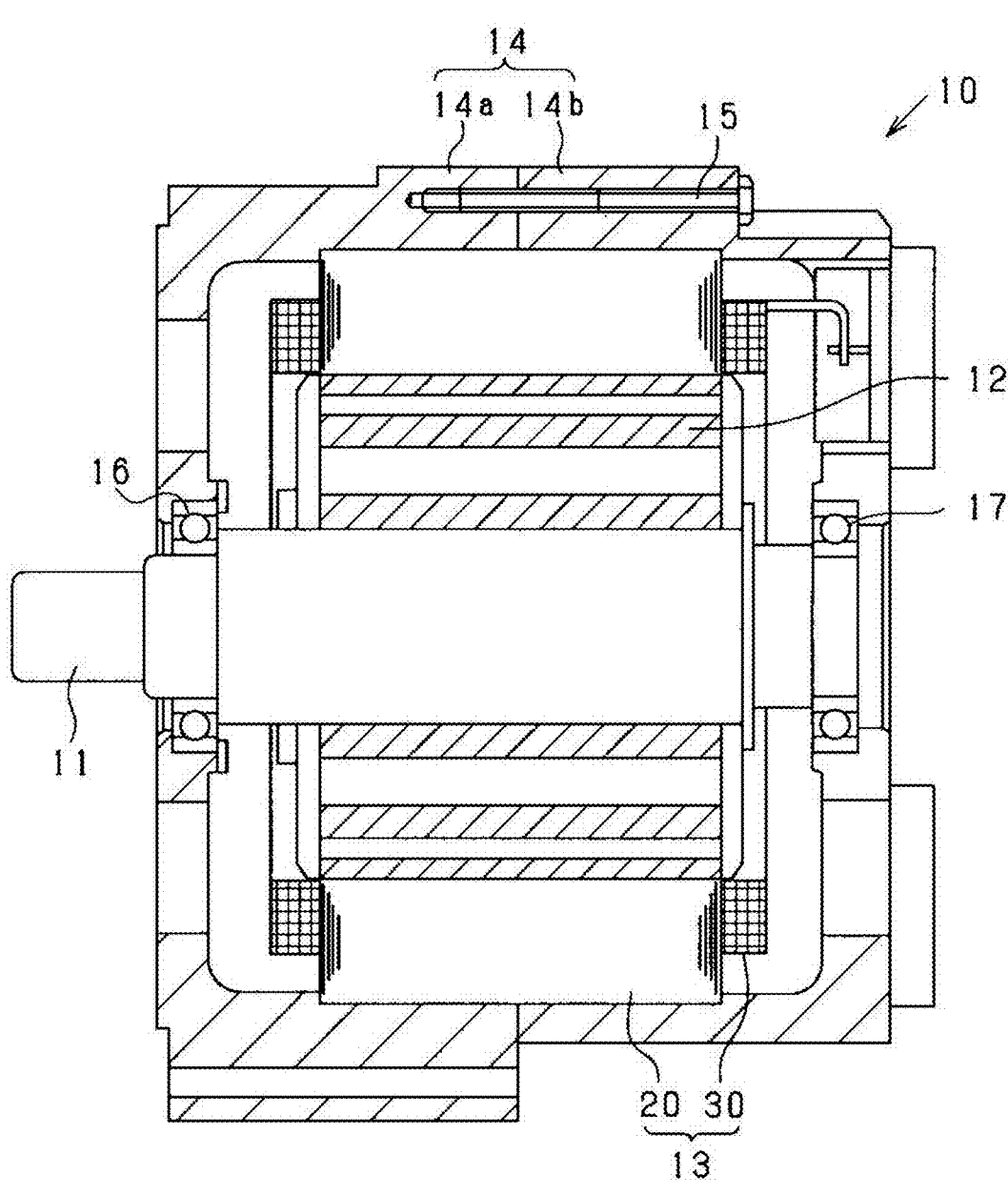
FIG. 1 is an axial cross-sectional view of a rotary electric machine according to an embodiment.

Previously, there has been proposed a technique of forming an insulation layer from an electrical insulation resin at a surface layer of respective stator windings of a stator for a rotary electric machine. Specifically, there has been proposed a technique of forming the insulation layer from a varnish which is an electrical insulation resin to increase an adhering strength of the stator windings relative to a stator core of the stator. Also, there has been proposed a technique of forming the insulation layer from a powder resin which is an electrical insulation resin to electrically insulate, for example, welding sections of the stator windings.

At the time of forming the insulation layer from the electrical insulation resin, the electrical insulation resin is coated to the stator windings, and the electrical insulation resin is cured in a state of a predetermined high temperature. For example, in a previously proposed stator, an insulation layer is first formed by a powder resin at welding sections of the stator windings (specifically, welding sections of conductor segments which are joined together by welding), and then another insulation layer is formed by a varnish at mounting portions of the stator windings which are mounted to the stator core. At the time of forming each of these insulation layers, each of the resin materials described above is cured in a high temperature state.

In the case where the insulation layers are formed at the stator windings by the different electrical insulation resins, respectively, which respectively have different glass transition temperatures, there is the following concern. Specifically, it is now assumed that one of the insulation layers is formed with the electrical insulation resin having a relatively low glass transition temperature in a pre-process, and then the other one of the insulation layers is formed with the electrical insulation resin having a relatively high glass transition temperature in a post-process. In this situation, at the time of forming the other insulation layer in the post-process, the resin material used in the pre-process is excessively heated, and thereby the insulation layer may be damaged. For example, in a case where the glass transition temperature of the varnish used in the post-process is higher than the glass transition temperature of the powder resin used in the pre-process, the excessive heating, which is excessive for the powder resin, takes place in the post-process, and thereby the temperature of the powder resin after the curing of the powder resin becomes high. This may increase the post-cooling stress and cause cracking and/or peeling of the insulation layer.

According to a first aspect of the present disclosure, there is provided a manufacturing method of a stator that includes a plurality of conductor wires wound to form a plurality of windings, the manufacturing method including:

a first process that includes:

coating a first electrical insulation resin to the plurality of windings;

then curing the first electrical insulation resin at a temperature or temperatures higher than a glass transition temperature of the first electrical insulation resin; and thereby forming a first insulation layer made of the first electrical insulation resin at each of the plurality of windings; and a second process that includes:

coating a second electrical insulation resin to the plurality of windings after the first process;

then curing the second electrical insulation resin at a temperature or temperatures higher than a glass transition temperature of the second electrical insulation resin; and thereby forming a second insulation layer made of the second electrical insulation resin at each of the plurality of windings, wherein the glass transition temperature of the first electrical insulation resin is higher than the glass transition temperature of the second electrical insulation resin.

At the time of manufacturing the stator, in the first process, the first electrical insulation resin, which has the higher glass transition temperature, is coated to the plurality of windings and is then cured at the temperature or temperatures (hereinafter, also written as the temperature(s)) higher than the glass transition temperature of the first electrical insulation resin. Thereby, the first insulation layer is formed. Furthermore, in the second process, the second electrical insulation resin, which has the lower glass transition temperature, is coated to the plurality of windings and is then cured at the temperature(s) higher than the glass transition temperature of the second electrical insulation resin. Thereby, the second insulation layer is formed. In this case, at the time of curing the second electrical insulation resin in the post-process (the second process), it is not required to set the temperature(s) to the excessively high temperature(s), which is excessively higher than the temperature(s) at the time of curing the first electrical insulation resin in the pre-process (the first process), and thereby it is possible to limit the occurrence of the disadvantage such as the damage of the first insulation layer. Therefore, in the case where the insulation layers are formed at each of the plurality of windings by using the different electrical insulation resins, which have the different glass transition temperatures, respectively, the insulation layers can be properly formed.

According to a second aspect, there is provided the manufacturing method according to the first aspect, wherein:

the first process includes heating the plurality of windings; and after executing the heating of the plurality of windings and the coating of the first electrical insulation resin to the plurality of windings in the first process, the coating of the second electrical insulation resin to the plurality of windings is executed in the second process in a state where a temperature of the plurality of windings is kept higher than the glass transition temperature of the second electrical insulation resin and enables the curing of the second electrical insulation resin.

After executing the heating of the stator windings and the coating of the first electrical insulation resin to the stator windings, the temperature of the stator windings is gradually decreased. However, in the case where the glass transition temperature of the first electrical insulation resin is higher than the glass transition temperature of the second electrical insulation resin, it is conceivable that the temperature of the stator windings during or after the curing of the first electrical insulation resin is higher than the curing temperature(s) which is required to cure the second electrical insulation resin. Therefore, the second insulation layer can be formed with the second electrical insulation resin without reheating of the stator windings at the time of coating the second electrical insulation resin to the stator windings. In this case, the reheating of the stator windings is not required in the second process. Therefore, the time required to form the insulation layers can be shortened, and the costs can be reduced.

According to a third aspect, there is provided the manufacturing method according to the first or second aspect, wherein the plurality of windings is placed in a state where a temperature decrease of the plurality of windings is limited by a heat-retaining member after the coating of the first electrical insulation resin to the plurality of windings in the first process.

At the time of executing the heating and the curing of the first electrical insulation resin, which has the relatively high glass transition temperature, in the first process, the heat of the stator windings is retained by using the heat-retaining member. In this case, the temperature decrease of the stator windings after the termination of the heating of the stator windings is slowed. Therefore, it is possible to reduce the heating temperature of the stator windings in the first process, and it is possible to shorten the time required for the curing of the first electrical insulation resin.

Furthermore, in the case where the coating and the curing of the second electrical insulation resin are executed without executing the reheating of the stator windings in the second process, it is possible to limit the occurrence of the disadvantage that the temperature of the stator windings is unintentionally decreased below the desired temperature, and thereby the second electrical insulation resin is not cured properly.

According to a fourth aspect, there is provided the manufacturing method according to any one of the first to third aspects, wherein in the first process, the coating of the first electrical insulation resin to the plurality of windings is executed while heating the plurality of windings.

In the first process, the first electrical insulation resin is coated to the stator windings during the time of heating the stator windings. In this way, the decrease of the temperature of the stator windings at the time of coating the first electrical insulation resin to the stator windings is limited, and this in turn shortens the curing time period of the first electrical insulation resin. By shortening the curing time period of the first electrical insulation resin, it is possible to limit the occurrence of the disadvantage that the first electrical insulation resin flows down to an unintended area, and thereby it is possible to limit the influence on the coating of the second electrical insulation resin in the second process.

Hereinafter, embodiments of a rotary electric machine according to the present disclosure will be described with reference to the drawings. In the present embodiment, an electric motor, which serves as the rotary electric machine, is used as an electric motor for a vehicle or an electric motor for an aircraft. The rotary electric machine of the present embodiment is applicable to, for example, a permanent magnet synchronous motor as well as a wound field motor and an induction machine, and the rotary electric machine of the present embodiment has three-phase windings. Among the following embodiments and modifications, portions, which are the same or equivalent to each other, will be indicated by the same reference signs, and redundant description of these portions are omitted for the sake of simplicity.

As shown in FIG. 1, the rotary electric machine 10 includes: a rotor 12 fixed to a rotatable shaft 11; a stator 13 which is installed to surround the rotor 12; and a housing 14 which receives the rotor 12 and the stator 13. The rotary electric machine 10 is an inner rotor type rotary electric machine, and the rotor 12 is rotatably placed on a radially inner side of the stator 13. In the present embodiment, an axial direction refers to an axial direction of a rotational axis of the rotatable shaft 11, and a radial direction refers to a direction perpendicular to the rotational axis of the rotatable shaft 11. Furthermore, a circumferential direction refers to a circumferential direction about the rotational axis of the rotatable shaft 11.

The housing 14 includes a pair of housing members 14a, 14b which are respectively shaped in a bottomed tubular form. The housing members 14a, 14b are fixed together by bolts 15 in a state where openings of the housing members 14a, 14b abut with each other. Two bearings 16, 17 are installed in the housing 14, and the rotatable shaft 11 and the rotor 12 are rotatably supported by the bearings 16, 17. The rotor 12 is placed on the radially inner side of the stator 13 and includes a plurality of magnetic poles arranged at predetermined intervals in the circumferential direction at an outer periphery of the rotor 12 such that polarities of the magnetic poles are alternately changed in the circumferential direction. These magnetic poles are formed by a plurality of permanent magnets which are embedded at the rotor 12 at predetermined positions, respectively.

Figure 2:
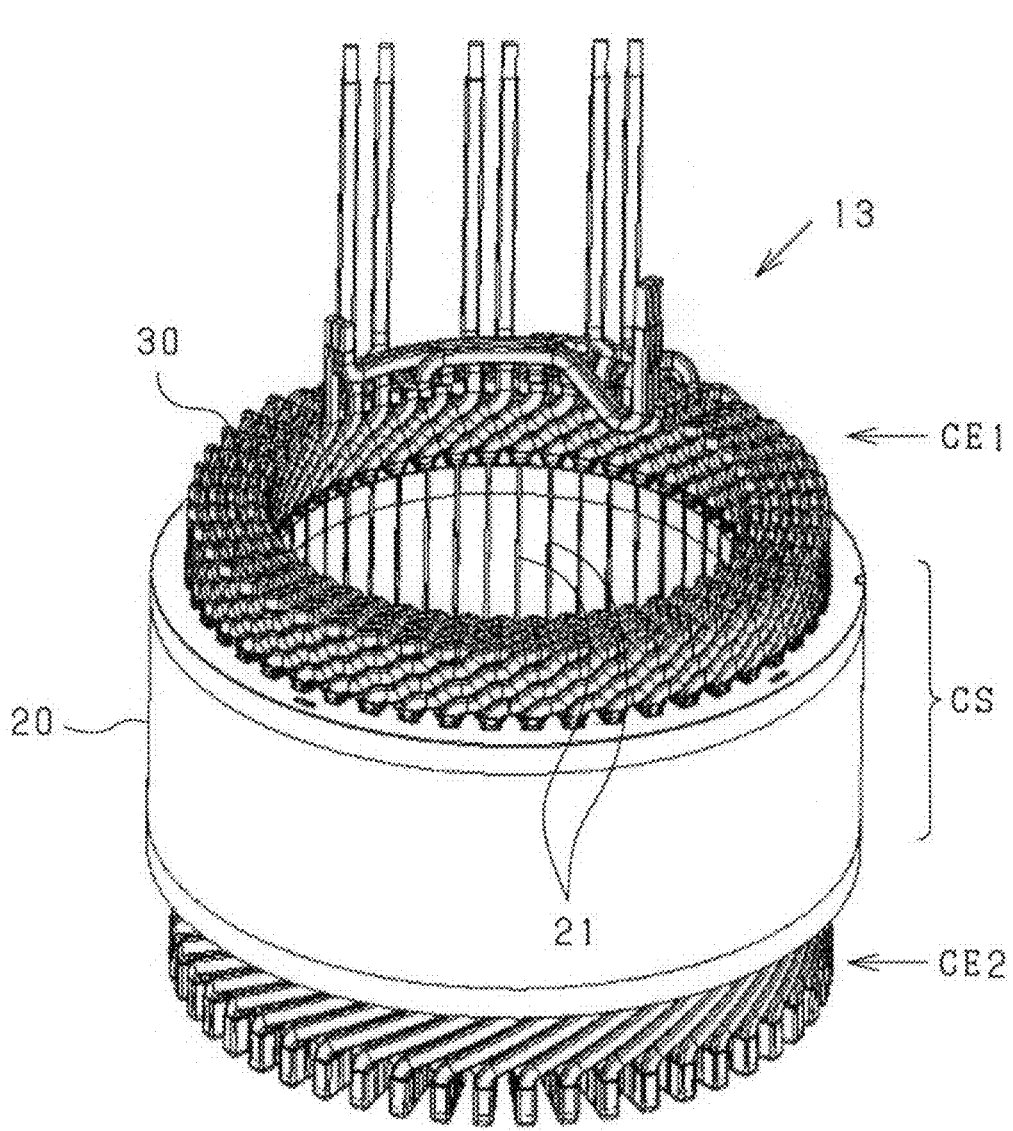
FIG. 2 is a perspective view of a stator as a whole.
Figure 3:
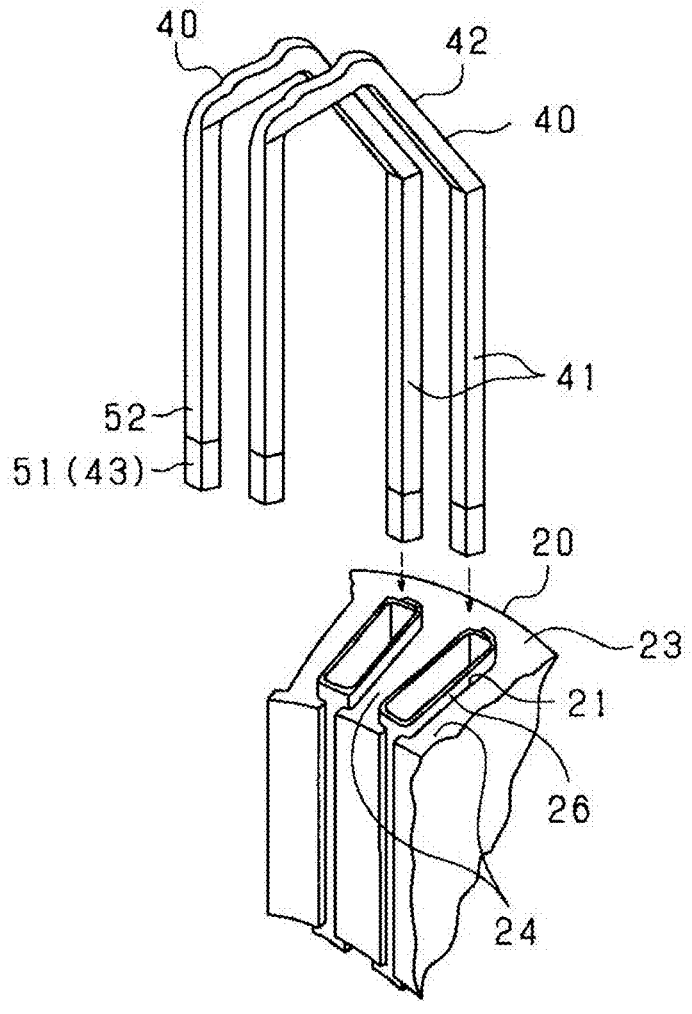
FIG. 3 is an explanation diagram showing a state of inserting conductor segments into a stator core.

Next, the stator 13 will be described. As shown in FIGS. 2 and 3, the stator 13 includes: a stator core 20 that is shaped in a circular ring form and has a plurality of slots 21 arranged in the circumferential direction; and a plurality of stator windings 30 wound to the slots 21 of the stator core 20. The stator windings 30 include a U-phase winding, a V-phase winding and a W-phase winding as phase windings, each of which is provided to a corresponding one of the phases. A range of the respective stator windings 30, which overlaps with the stator core 20 in the axial direction, is referred to as a coil side portion CS. Furthermore, a portion of the respective stator windings 30, which axially outwardly projects from the stator core 20 on one axial side, is referred to as a first coil end portion CE1, and another portion of the respective stator windings 30, which axially outwardly projects from the stator core 20 on the other axial side, is referred to as a second coil end portion CE2.

The stator core 20 includes: a back yoke 23 which is shaped in a circular ring form; and a plurality of teeth 24 which radially inwardly project from the back yoke 23 and are arranged at predetermined intervals in the circumferential direction. Each of the slots 21 is formed between corresponding adjacent two of the teeth 24. Each of the slots 21 is shaped such that an opening of the slot is elongated in the radial direction, and the slots 21 are arranged at equal intervals in the circumferential direction at the stator core 20. The stator windings 30 are installed in a state where the stator windings 30 are wound to the slots 21. The stator core 20 is formed as a core sheet laminated body that includes a plurality of core sheets which are electrical steel sheets made of a magnetic material and are stacked in the axial direction.

The stator windings 30 are formed such that the three-phase windings are connected to form a Y-connection (a star connection). When an electric power (AC power) is supplied from an electric power source to the stator windings 30 through an inverter (not shown), a magnetic flux is generated. The stator windings 30 are formed by using a plurality of conductor segments 40. Each of the conductor segments 40 is in a form of a segmental conductor that is formed by processing an electrical conductor generally having a rectangular cross section (flat rectangular cross section) into a U-shape. The conductor segments 40 serve as conductor wires. Hereinafter, a segment structure of the stator windings 30 will be described in detail.

As shown in FIG. 3, each of the conductor segments 40 is generally shaped in a U-shape form and includes: a pair of straight portions 41 respectively shaped in a straight form; and a turn portion 42 which is bent to join between the pair of straight portions 41. The pair of straight portions 41 respectively have a length that is longer than an axial thickness of the stator core 20. The conductor segment 40 is formed by a flat rectangular conductor wire that is formed by covering a conductor 51, which has a rectangular transverse cross-section, with an insulation coating 52. The insulation coating 52 is removed at an end part 43, which is a distal end part of each straight portion 41, to form a conductor-exposed part at which the conductor 51 is exposed.

The corresponding conductor segments 40 are inserted in each of the slots 21 of the stator core 20 such that these conductor segments 40 are linearly arranged in the radial direction in the slot 21. In the present embodiment, the corresponding conductor segments 40 are received in each slot 21 in a stacked state where the corresponding straight portions 41 of the conductor segments 40 form eight layers in the slot 21. The pair of straight portions 41 of each conductor segment 40 are respectively received in corresponding two of the slots 21 which are spaced from each other by a predetermined coil pitch. A part of each straight portion 41, which is received in the corresponding slot 21, is the coil side portion CS. An insulation sheet 26, which electrically insulates between the stator core 20 and the stator windings 30 (the conductor segments 40), is inserted into each of the slots 21. The insulation sheet 26 is folded to collectively surround the conductor segments 40 inserted in the slot 21, and the insulation sheet 26 is held between an inner peripheral surface (inner wall surface) of the stator core 20 and the conductor segments 40 in the slot 21.

The pair of straight portions 41 of each conductor segment 40 are respectively received in the corresponding two slots 21 such that a radial position of one of the straight portions 41 is radially displaced from a radial position of the other one of the straight portions 41. For example, when one of the straight portions 41 is received at an nth position from a radially outermost position (back yoke side) in the one slot 21, the other one of the straight portions 41 is received at an n+1 position from the radially outermost position in the other slot 21.

At the time of inserting each conductor segment 40 into the corresponding slots 21 of the stator core 20, the straight portions 41 of each conductor segment 40 are inserted from a first end of the stator core 20 among the first and second ends of the stator core 20, and the end parts 43 of the straight portions 41 project from the second end of the stator core 20. In this case, the turn portion 42 of the conductor segment 40 forms the first coil end portion CE1 at the first end of the stator core 20. Furthermore, at the second end of the stator core 20, a part of each straight portion 41, which is opposite to the turn portion 42, is bent in the circumferential direction, and the end parts 43 (more specifically, welding sections of the end parts 43) of different conductor segments 40 are joined by welding to form the second coil end portion CE2.

Figure 4:
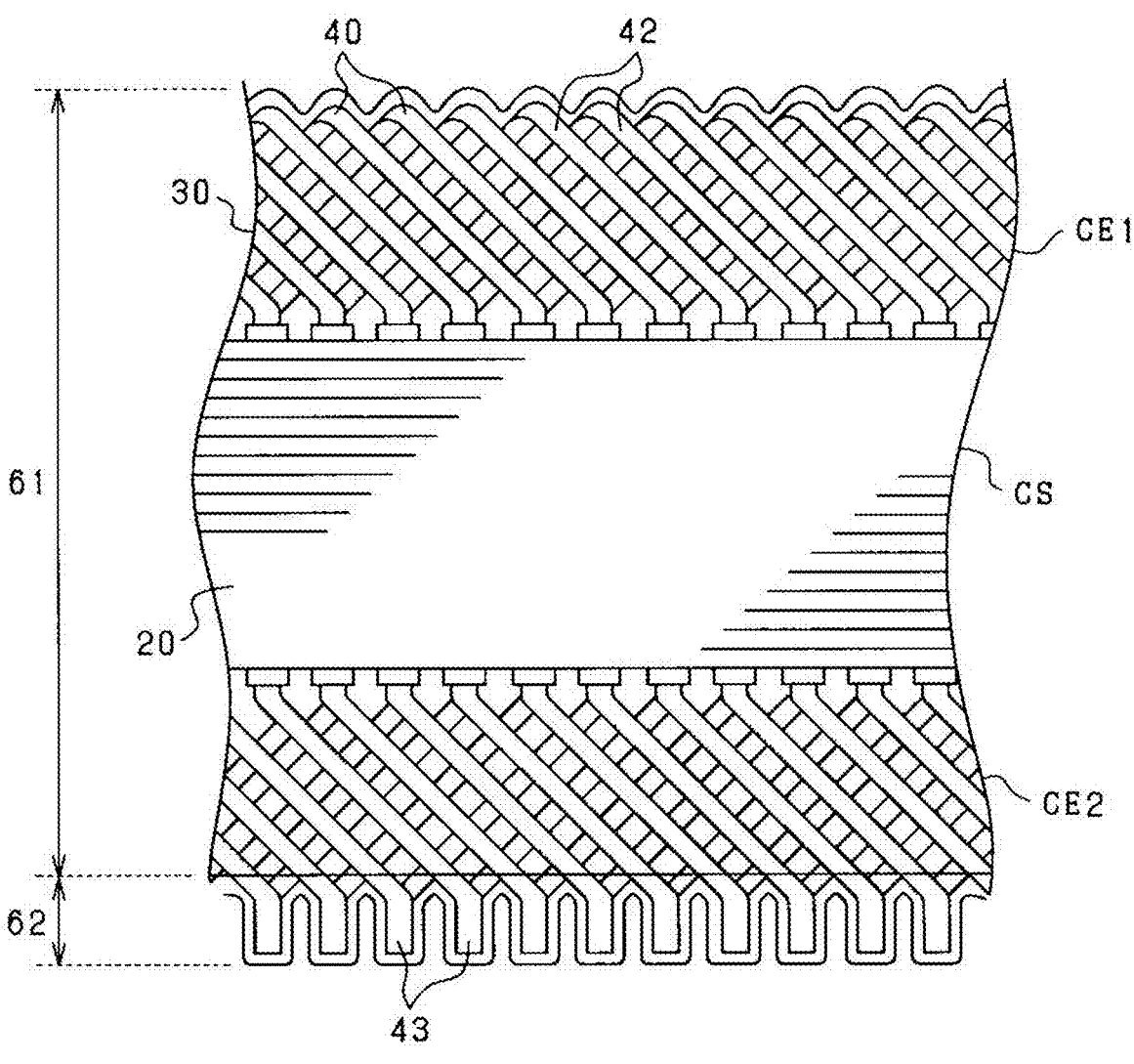
FIG. 4 is an enlarged partial front view of the stator.

At the stator 13, an insulation covering is applied to the stator windings 30, and this structure will be described hereinafter. Specifically, the insulation covering is applied to each coil end portion CE 1, CE2 and the coil side portion CS of the respective stator windings 30, and FIG. 4 shows an overview of this configuration. FIG. 4 is a front view of the stator 13.

In FIG. 4, among the two opposite axial sides of the stator core 20, the turn portion 42 side of the conductor segments 40 is the first coil end portion CE1, and the end part 43 side of the conductor segments 40 is the second coil end portion CE2. Furthermore, an overlapping range of the conductor segments 40, which overlaps with the stator core 20, is the coil side portion CS. At the stator windings 30, a first covering portion 61 is formed at each conductor segment 40 except the welding section of the end part 43, and a second covering portion 62 is formed at a portion of the conductor segment 40, which corresponds to the welding section of the end part 43. In other words, the first covering portion 61 is formed to cover the entire range of the first coil end portion CE1 and the entire range of the coil side portion CS and the part of the second coil end portion CE2 other than the welding section of the end part 43. Here, the first covering portion 61 may be formed in a range which includes at least the first coil end portion CE1 and the coil side portion CS. Furthermore, the second covering portion 62 is formed to cover the welding section of the end part 43 at the second coil end portion CE2.

The first covering portion 61 is formed, for example, to adhere the stator windings 30 to the stator core 20 to increase the mechanical strength and to provide water and corrosion resistance to the stator windings 30. A first resin material (a first electrical insulation resin) used for the first covering portion 61 is a resin material generally referred to as a varnish. Any synthetic resin, such as an epoxy based synthetic resin, a phenol based synthetic resin, a polyester based synthetic resin, a silicone based synthetic resin, can be used as the first resin material.

The second covering portion 62 is formed to protect the welding section of the end part 43 of the conductor segment 40 and to provide the insulation to the conductor-exposed part of the end part 43. A second resin material (a second electrical insulation resin) used for the second covering portion 62 may be, for example, a powder resin. Specifically, the powder resin may include an epoxy-based or polyester-based resin component as a main component of the powder resin.

The first covering portion 61 and the second covering portion 62 are formed as two insulation covering layers respectively made of the different resin materials which have different glass transition temperatures, respectively. In the present embodiment, the first resin material used for the first covering portion 61 is the resin material having a relatively high glass transition temperature, and the second resin material used for the second covering portion 62 is the resin material having a relatively low glass transition temperature. In other words, the glass transition temperature Tg1 of the first resin material and the glass transition temperature Tg2 of the second resin material are in the relationship Tg1>Tg2. For example, the glass transition temperature Tg1 of the varnish, which serves as the first resin material, is 170° C., and the glass transition temperature Tg2 of the powder resin, which serves as the second resin material, is 130° C. The first covering portion 61 serves as a first insulation layer, and the second covering portion 62 serves as a second insulation layer.

Figure 5:
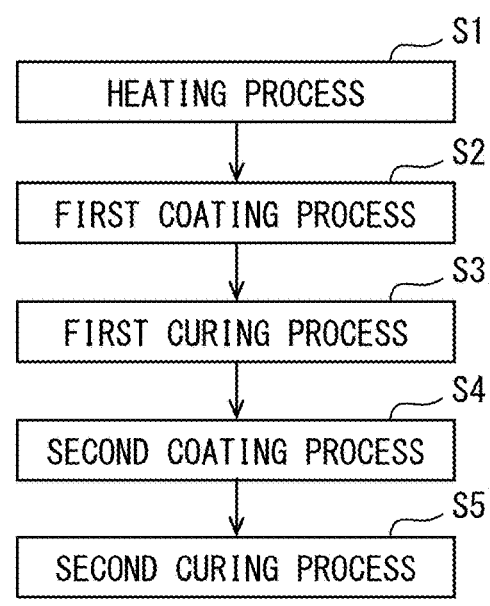
FIG. 5 is a flowchart showing processes for forming covering portions of stator windings.
Figure 6:
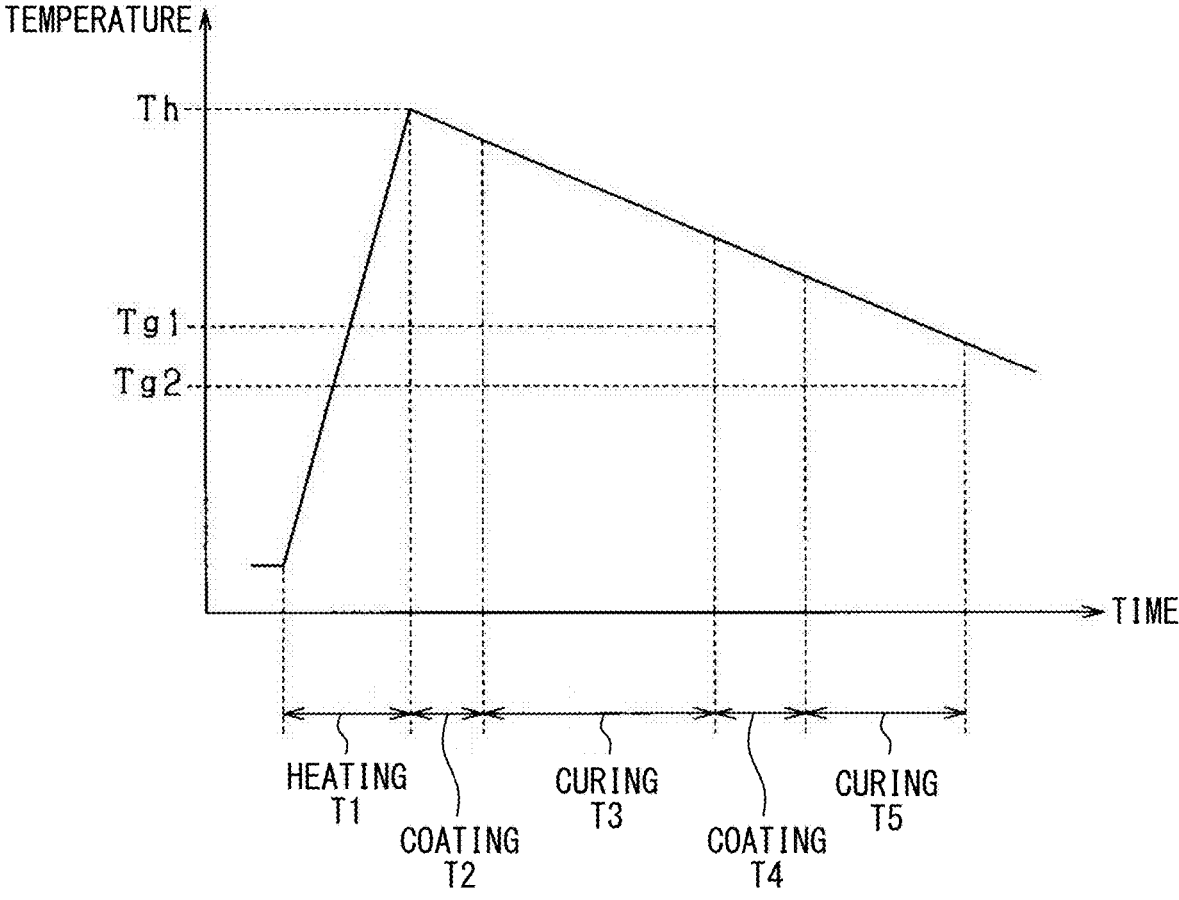
FIG. 6 is a time chart showing a transition of a winding temperature at the time of forming the covering portions.

Hereinafter, a manufacturing procedure of the stator 13 will be described. FIG. 5 is a flowchart showing processes for forming the respective covering portions 61, 62 of the stator windings 30 according to a manufacturing method of the stator 13 in the present embodiment. FIG. 6 is a time chart showing a transition of the temperature of the stator windings 30 at the time of forming the respective covering portions 61, 62. Here, there will be described a procedure after completion of assembling of the conductor segments 40 to the stator core 20 and completion of the welding of the end parts 43 of the conductor segments 40 at the stator 13.

In FIG. 5, the first covering portion 61 is first formed by the first resin material at the stator windings 30, and then the second covering portion 62 is formed by the second resin material at the stator windings 30. In FIG. 5, processes S1-S3 are for forming the first covering portion 61 at the respective stator windings 30, and processes S4-S5 are for forming the second covering portion 62 at the respective stator winding 30. Here, the processes S1-S3 collectively serve as a first process (also collectively referred to as a forming process or a pre-process), and the processes S4-S5 collectively serve as a second process (also collectively referred to as a forming process or a post-process).

Figure 7:
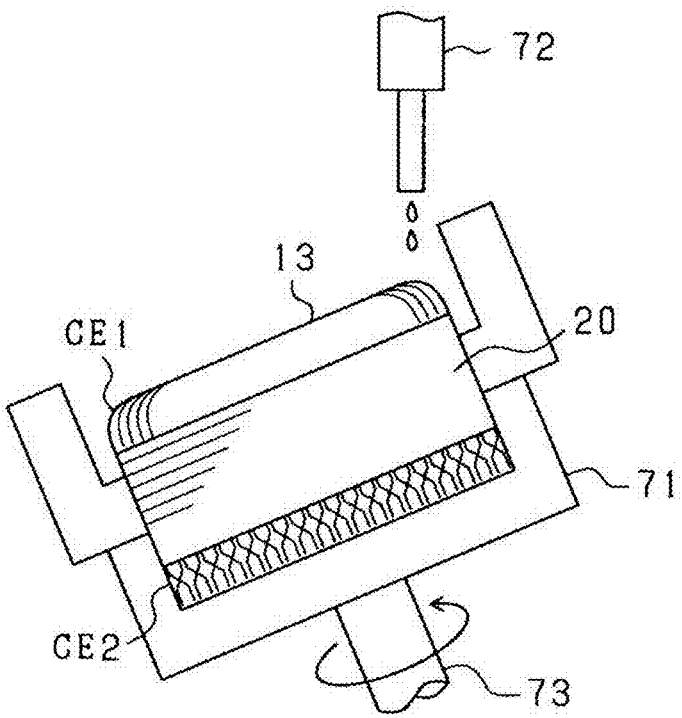
FIG. 7 is an explanation diagram for explaining a process of forming a first covering portion.

At the forming process (S1-S3) of the first covering portion 61, the stator 13 is installed on a jig 71 shown in FIG. 7, and the first covering portion 61 is formed in this state by the first resin material supplied from a dispenser 72. The first resin material is, for example, the varnish. In FIG. 7, the stator 13 is installed to the jig 71 such that: the first coil end portion CE1 faces the upper side; the second coil end portion CE2 faces the lower side; and the central axis of the stator 13 is tilted relative to the gravitational direction.

In the process S1, the stator windings 30 are heated to a predetermined temperature that is higher than the glass transition temperature Tg1 of the first resin material (heating process). At this time, the stator windings 30 are energized under a predetermined energization condition, and thereby the stator windings 30 are heated to the predetermined temperature. The amount of energization electric current and the energization time period may be predetermined as the energization condition. It is also possible to sense the temperature of the stator windings 30 using a temperature sensor or the like, and the heating of the stator windings 30 through the energization of the stator windings 30 may be kept until the sensed temperature of the stator windings 30 reaches the predetermined target temperature.

In the process S2, the first resin material in a liquid phase is applied from the dispenser 72 to the first coil end portion CE1 of the respective stator windings 30 (first coating process). At this time, the first resin material is dripped from the dispenser 72 at a predetermined amount per unit time while the stator 13 is rotated together with the jig 71 as the jig 71 is rotated about a rotational axis of a rotatable shaft 73 of the jig 71. Therefore, the first resin material is circumferentially applied to the first coil end portion CE1 of the respective stator windings 30. When the first resin material is applied to the first coil end portion CE1 of the respective stator windings 30, the first resin material flows along the conductor segments 40 into the slots 21 (the coil side portion CS) and then flows out to the second coil end portion CE2 side located on the opposite side that is opposite to the first coil end portion CE1 side. In other words, a thin layer of the first resin material is formed on the respective stator windings 30 in an axial range from the first coil end portion CE1 to the second coil end portion CE2 in the axial direction. The first resin material may be applied to the range that is at least from the first coil end portion CE1 to the coil side portion CS. At this time, the stator 13 may be oriented horizontally while the second coil end portion CE2 faces the lower side, and in this state, the first resin material may be flown from the first coil end portion CE1 side to the second coil end portion CE2 side.

Then, in the process S3, the first resin material is cured under the condition that the temperature of the stator windings 30 is kept at a predetermined curing temperature range (first curing process). In other words, the first resin material is cured to form the first covering portion 61 in the state where the surface of the respective stator windings 30 is covered with the first resin material. Specifically, after the coating of the first resin material, when the temperature of the stator windings 30 gradually decreases, the first resin material is cured to form the first covering portion 61.

In the time chart of FIG. 6, during a time period T1, the stator windings 30 are heated to a predetermined heating temperature Th, which is higher than the glass transition temperature Tg1 of the first resin material. Next, during a time period T2, the first resin material is coated to the first coil end portion CE1 of the respective stator windings 30, and then during a time period T3, the first resin material is cured in the high temperature environment where the temperature is kept at the predetermined curing temperature range (predetermined curing temperatures or a predetermined curing temperature) higher than the glass transition temperature Tg1 of the first resin material. Therefore, the first covering portion 61 is formed.

In FIG. 5, after the formation of the first covering portion 61, the process of forming the second covering portion 62 with the second resin material is continued. In the forming process (S4-S5) of the second covering portion 62, the second covering portion 62 is formed by using the second resin material having the glass transition temperature lower than the glass transition temperature of the first resin material, and the second resin material is cured by using the remaining heat of the stator windings 30 which remains after the forming process of the first covering portion 61. In other words, in this embodiment, the stator windings 30 are not reheated in the forming process of the second covering portion 62.

Figure 8:
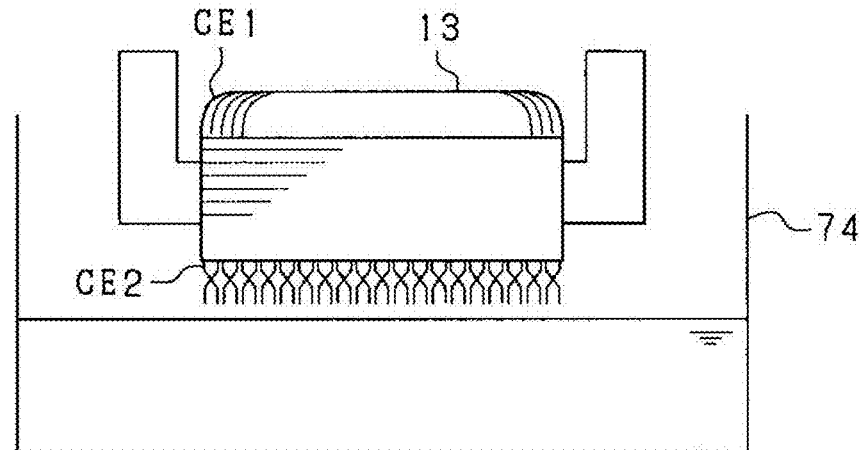
FIG. 8 is an explanation diagram for explaining a process of forming a second covering portion.

In the process S4, the second resin material is coated to the axial distal end part (welding section) of the second coil end portion CE2 of the respective stator windings 30 (second coating process). The second resin material is, for example, the powder resin. Specifically, as shown in FIG. 8, the second resin material in a liquid phase is filled in an immersion tank 74, and the welding section of the second coil end portion CE2 of the respective stator windings 30 is immersed in the immersion tank 74 to adhere the second resin material to a surface of the welding section. In the process S4, after the formation of the first covering portion 61 with the first resin material having the relatively high glass transition temperature, the second resin material is coated to the stator windings 30 before the winding temperature (i.e., the temperature of the stator windings 30) is decreased below the glass transition temperature of the second resin material which has the relatively low glass transition temperature.

Then, in the process S5, the second coil end portion CE2 of the respective stator windings 30 is pulled up from the immersion tank 74, and the second resin material is cured at a predetermined temperature range (predetermined curing temperatures or a predetermined curing temperature) higher than the glass transition temperature Tg2 of the second resin material (second curing process). Therefore, the second covering portion 62 is formed by the second resin material at the welding section of the second coil end portion CE2 of the respective stator windings 30.

In the time chart of FIG. 6, during the time period T4, the second resin material is coated to the welding section of the second coil end portion CE2 of the respective stator windings 30 in the state where the stator windings 30 are at the predetermined temperature(s) higher than the glass transition temperature Tg2 of the second resin material by the remaining heat of the stator windings 30 which remains after the forming process (S1-S3) of the first covering portion 61. Then, during the time period T5, the second covering portion 62 is formed by the curing of the second resin material. The second resin material may be applied either during the time of curing the first resin material or after the time of curing the first resin material.

Here, there is assumed an imaginary case where the second covering portion 62 is formed first with the second resin material having the low Tg (i.e., the low glass transition temperature), and thereafter the first covering portion 61 is formed with the first resin material having the high Tg (i.e., the high glass transition temperature). In such a case, the second covering portion 62 (the second resin material) is excessively reheated at the time of forming the first covering portion 61. Therefore, a post-cooling stress is increased in the second covering portion 62, and thereby there is a concern about the occurrence of a disadvantage such as cracking. In contrast, according to the present embodiment, the first covering portion 61 is formed first with the first resin material having the high Tg, and thereafter the second covering portion 62 is formed with the second resin material having the low Tg. Therefore, the second covering portion 62 (the second resin material) is not excessively heated, and the stress after the cooling of the second covering portion 62 (the second resin material) is reduced.

In the forming process (S1-S3) of the first covering portion 61, the heating temperature Th at the time of heating the stator windings 30 may be determined based on: the glass transition temperature Tg1 of the first resin material (the varnish); a decreasing rate of the temperature (the amount of temperature decrease per unit time) of the stator windings 30 in the environment after the heating of the stator windings 30; and the curing time period required to cure the first resin material at the curing temperature(s) higher than the glass transition temperature Tg1. The decreasing rate of the temperature (the temperature decreasing environment) of the stator windings 30 after the heating of the stator windings 30 may be determined based on: the heating temperature Th at the time of heating the stator windings 30; and the curing time period of the first resin material.

Furthermore, in the forming process (S4-S5) of the second covering portion 62, the timing of coating the second resin material may be determined based on: the glass transition temperature Tg2 of the second resin material (the powder resin); the decreasing rate of the temperature of the stator windings 30; and the curing time period required to cure the second resin material at the curing temperature(s) higher than the glass transition temperature Tg2. In this way, the processing condition at the time of forming each of the covering portions 61, 62 can be appropriately set.

Figure 9:
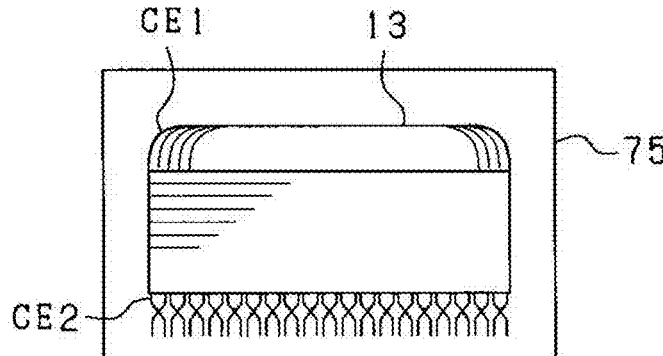
FIG. 9 is a diagram showing a state of retaining the heat of the stator by a heat-retaining member.
Figure 10:
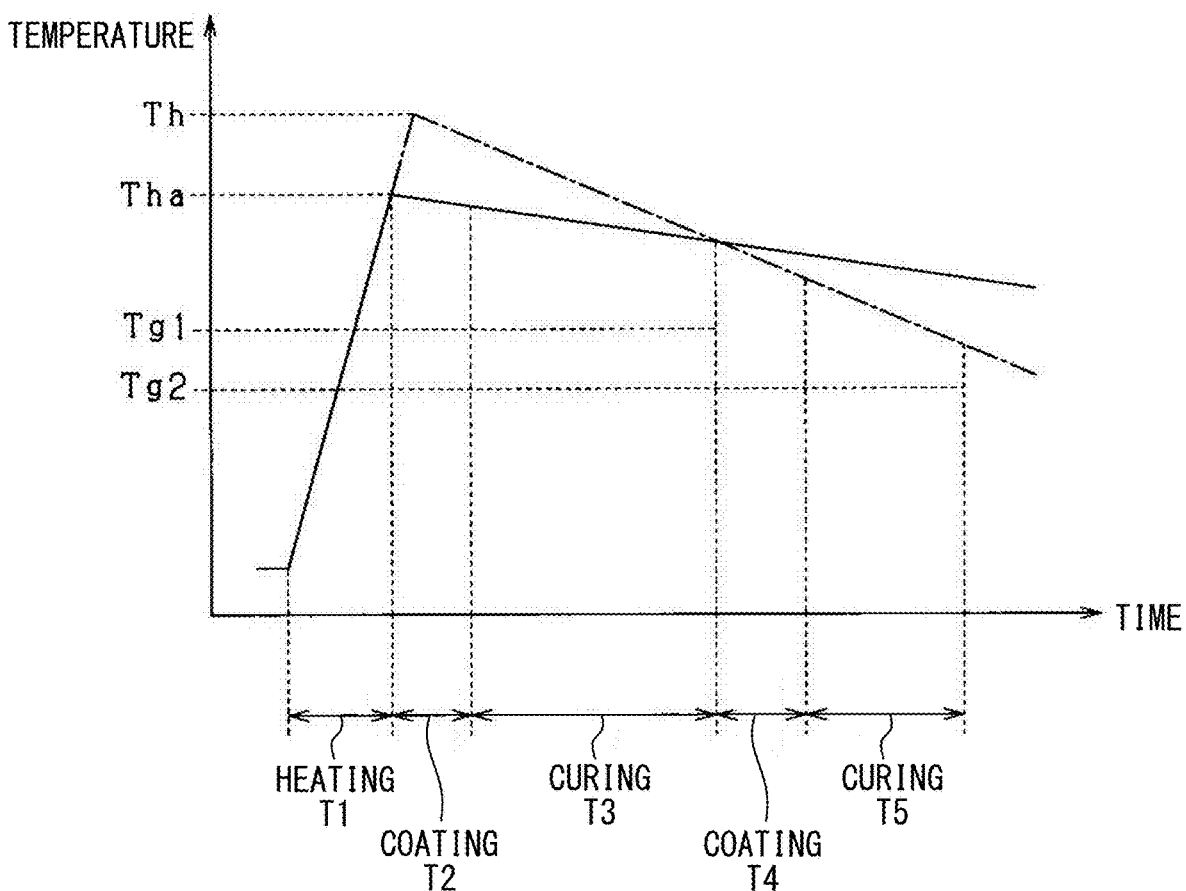
FIG. 10 is a time chart showing a transition of the winding temperature at the time of forming the covering portions.

In the forming process (S1-S3) of the first covering portion 61, a heat-retaining member may be used to limit a temperature decrease of the stator windings 30. Specifically, as shown in FIG. 9, the stator 13 may be covered with a heat-retaining cover 75 which serves as the heat-retaining member. In this case, as shown in FIG. 10, decreasing of the temperature of the stator windings 30 after the heating of the stator windings 30 in the process S1 is limited. In FIG. 10, a dot-dash line indicates a change in the temperature of the stator windings 30 in the case where the heat-retaining cover 75 is not used. In the case where the heat-retaining cover 75 is not used, the stator windings 30 are heated to the heating temperature Th. In contrast, in the case where the heat-retaining cover 75 is used, the stator windings 30 are heated to a heating temperature Tha.

In FIG. 10, after the stator windings 30 are heated to the heating temperature Tha during the time period T1, the temperature of the stator windings 30 is decreased relatively slowly. Therefore, it is possible to decrease the heating temperature of the stator windings 30. In FIG. 10, the heating temperature is set to the heating temperature Tha which is lower than the heating temperature Th in the anticipation of the slower decrease in the temperature of the stator windings 30. However, in a case where the heating temperature is set to the heating temperature Th, the temperature of the stator windings 30 is maintained at the higher temperature(s). Therefore, in such a case, the time period required to cure the first resin material can be shortened.

The heat-retaining member may be other than the heat-retaining cover 75, and a heat-retaining box, which receives the stator 13 in a closed environment, may be used as the heat-retaining member.

Figure 11:
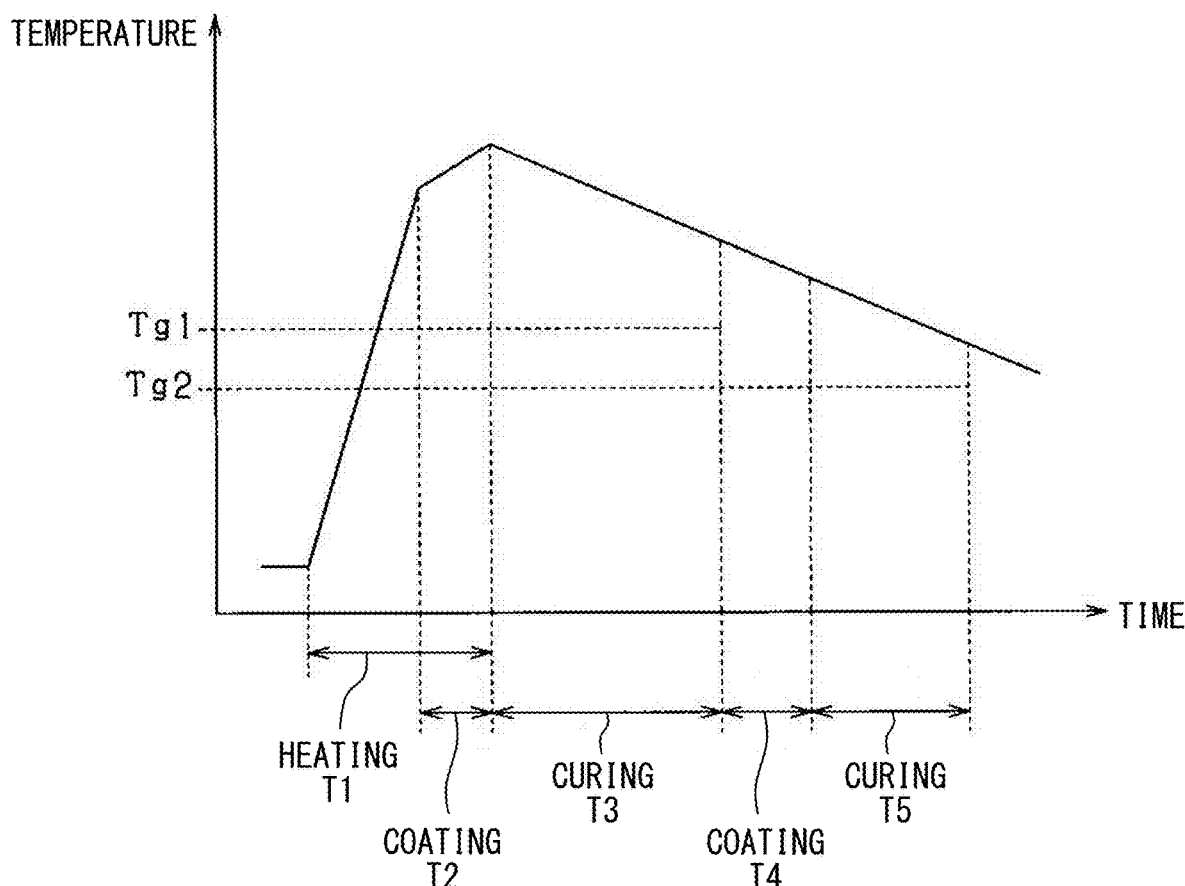
FIG. 11 is a time chart showing a transition of the winding temperature at the time of forming the covering portions.

Furthermore, as shown in FIG. 11, the heating of the stator windings 30 may be maintained during the time period T2 (first coating process) in which the first resin material is coated to the stator windings 30. In other words, the heating time period of the stator windings 30 and the coating time period of the first resin material may partially overlap with each other. In this way, the decrease of the temperature of the stator windings 30 at the time of coating the first resin material to the stator windings 30 is limited, and this in turn shortens the curing time period of the first resin material.

The embodiment described above can achieve the following advantages.

At the time of manufacturing the stator 13, in the pre-process (S1 to S3), the first resin material, which has the high glass transition temperature, is coated to the stator windings 30 and is then cured at the temperatures (or the temperature) higher than the glass transition temperature Tg1 of the first resin material. Thereby, the first covering portion 61 is formed. Furthermore, in the post-process (S4 to S5), the second resin material, which has the low glass transition temperature, is coated to the stator windings 30 and is then cured at the temperatures (or the temperature) higher than the glass transition temperature Tg2 of the second resin material. Thereby, the second covering portion 62 is formed. In this case, at the time of curing the second resin material, it is not required to set the temperature to the excessively high temperature, which is excessively higher than the temperature(s) at the time of curing the first resin material in the pre-process, and thereby it is possible to limit the occurrence of the disadvantage such as the damage of the first covering portion 61. Therefore, in the case where the insulation layers (covering portions 61, 62) are formed at the respective stator windings 30 by using the different resin materials, which have the different glass transition temperatures, respectively, the insulation layers can be properly formed.

The temperature of the stator windings 30 is gradually decreased after the heating of the stator windings 30 and the coating of the first resin material to the respective stator windings 30. However, in the case where the glass transition temperature Tg1 of the first resin material is higher than the glass transition temperature Tg2 of the second resin material, it is conceivable that the temperature of the stator windings 30 during or after the curing of the first resin material is higher than the curing temperature(s) which is required to cure the second resin material. Therefore, the second covering portion 62 can be formed with the second resin material without executing the reheating of the stator windings 30 at the time of coating the second resin material to the stator windings 30. In view of this point, the second resin material is coated to the stator windings 30 in the state where the temperature of the stator windings 30 is kept to the temperature(s), which is higher than the glass transition temperature Tg2 of the second resin material and enables the curing of the second resin material, at the time of decreasing the temperature of the stator windings 30 after the coating of the first resin material to the stator windings 30 (see FIG. 6). In this case, the reheating of the stator windings 30 is not required in the post-process. Therefore, the time required to form the insulation layers can be shortened, and the costs can be reduced.

At the time of executing the heating and the curing of the first resin material, which has the relatively high glass transition temperature, in the pre-process (S1 to S3), the heat of the stator windings 30 is retained by using the heat-retaining cover 75 (see FIGS. 9 and 10). In this case, the temperature decrease of the stator windings 30 after the termination of the heating of the stator windings 30 is slowed. Therefore, it is possible to reduce the heating temperature of the stator windings 30 in the first process, and it is possible to shorten the time required for the curing of the first resin material.

Furthermore, in the case where the coating and the curing of the second resin material are executed without executing the reheating of the stator windings 30 in the post-process (S4 to S5), by using the heat-retaining cover 75, it is possible to limit the occurrence of the disadvantage that the temperature of the stator windings 30 is unintentionally decreased below the desired temperature, and thereby the second resin material is not cured properly.

In the pre-process (S1 to S3), the first resin material is coated to the stator windings 30 during the time of heating the stator windings 30 (see FIG. 11). In this way, the decrease of the temperature of the stator windings 30 at the time of coating the first resin material to the stator windings 30 is limited, and this in turn shortens the curing time period of the first resin material. By shortening the curing time of the first resin material, it is possible to limit the occurrence of the disadvantage that the first resin material flows down to an unintended area, and thereby it is possible to limit the influence on the coating of the second resin material in the post-process.

Other Embodiments

The above embodiment may be modified, for example, as follows.

Figure 12:
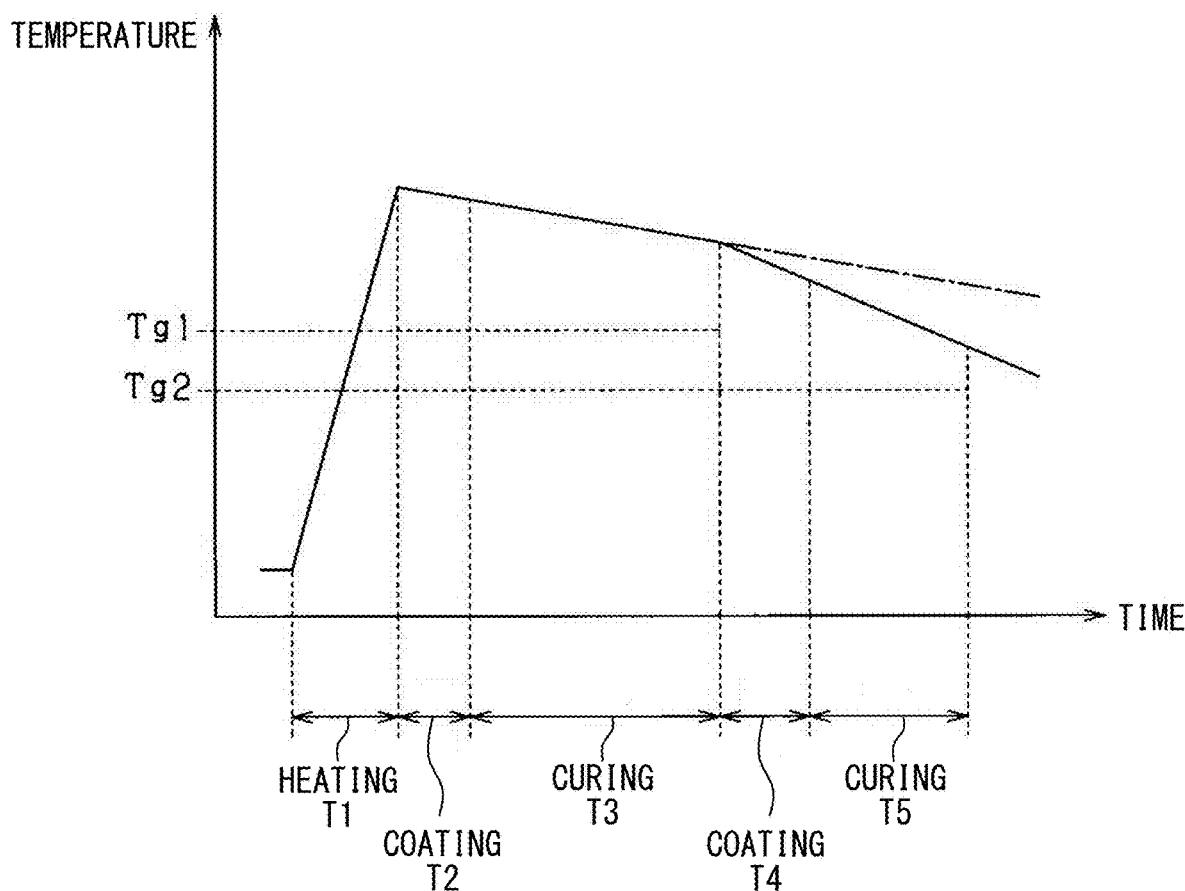
FIG. 12 is a time chart showing a transition of the winding temperature at the time of forming the covering portions.

As shown in FIG. 12, the decrease in the temperature of the stator windings 30 may be limited by using the heat-retaining cover 75 in the pre-process (S1 to S3), and the decrease in the temperature of the stator windings 30 may not be limited by eliminating the use the heat-retaining cover 75 in the post-process (S4 to S5). In this case, a slope of the decrease in the temperature of the stator windings 30 in the pre-process differs from a slope of the decrease in the temperature of the stator windings 30 in the post-process. The slope of the decrease in the temperature of the stator windings 30 in the post-process is steeper than the slope of the decrease in the temperature of the stator windings 30 in the pre-process. Therefore, in the heat radiation of the stator windings 30 can be limited in the pre-process in anticipation of the heat demand for curing the second resin material in the post-process, and the temperature of the stator windings 30 can be quickly reduced to the room temperature after the curing of the second resin material in the post-process. In this way, the time period required for the formation of the covering portions can be reduced.

Figure 13:
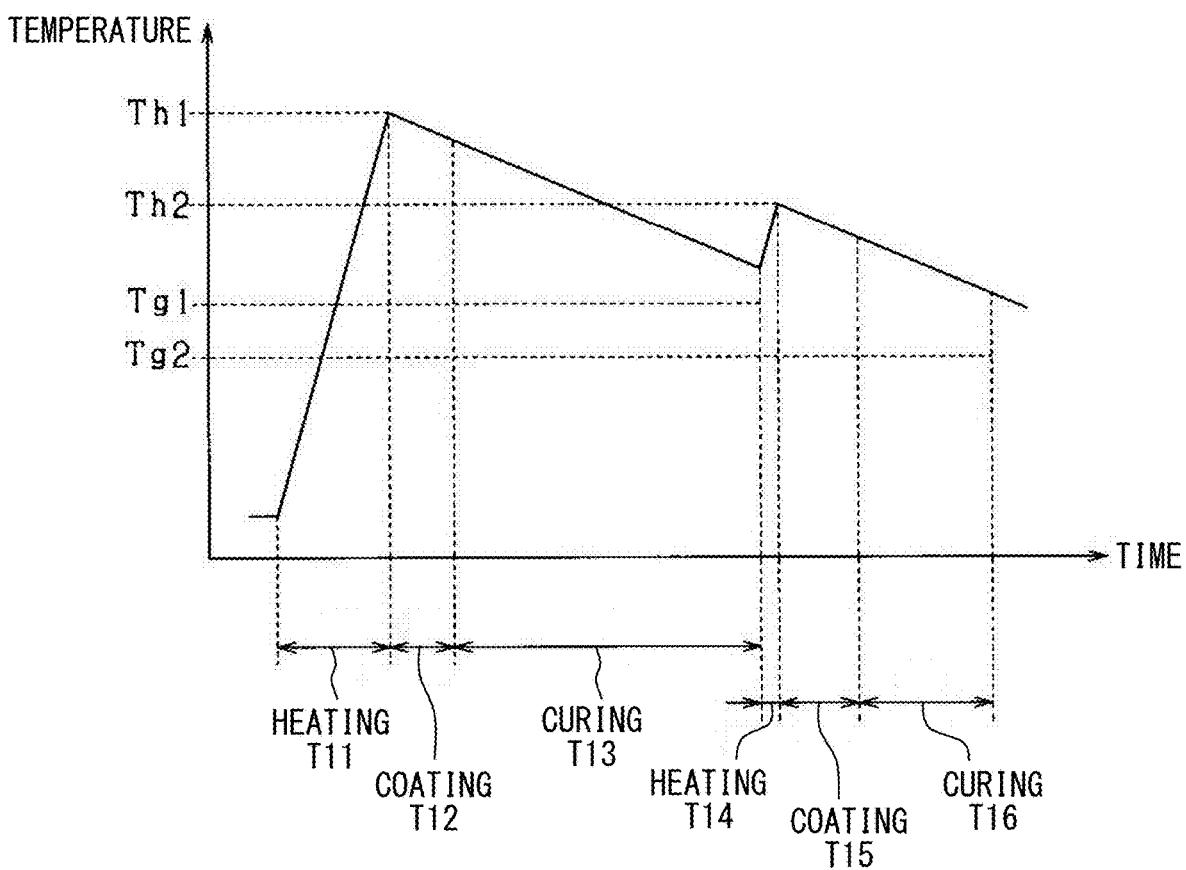
FIG. 13 is a time chart showing a transition of the winding temperature at the time of forming the covering portions.

As shown in FIG. 13, the heating of the stator windings 30 may be executed in each of the forming process of the first covering portion 61 and the forming process of the second covering portion 62.

In FIG. 13, during a time period T11, the stator windings 30 are heated to a predetermined heating temperature Th1, which is higher than the glass transition temperature Tg1 of the first resin material (the varnish). Next, the first resin material is coated to the stator windings 30 during a time period T12, and the first resin material is cured in the temperature environment where the temperature of the stator windings 30 is higher than the glass transition temperature Tg1 of the first resin material during a time period T13. Therefore, the first covering portion 61 is formed.

Then, during a time period T14, the stator windings 30 are reheated to a predetermined heating temperature Th2, which is higher than the glass transition temperature Tg2 of the second resin material (the powder resin). Next, the second resin material is coated to the stator windings 30 during a time period T15, and the second resin material is cured in the temperature environment where the temperature of the stator windings 30 is higher than the glass transition temperature Tg2 of the second resin material during a time period T16. Therefore, the second covering portion 62 is formed.

In the forming process (time periods T4 to T6) of the second covering portion 62, the heating temperature Th2 at the time of heating the stator windings 30 may be determined based on: the glass transition temperature Tg2 of the second resin material; a decreasing rate of the temperature (the amount of temperature decrease per unit time) of the stator windings 30 in the environment after the heating of the stator windings 30; and the curing time period required to cure the second resin material at the curing temperature(s) higher than the glass transition temperature Tg2.

In the embodiment described above, the stator windings 30 are heated by the energization of the stator windings 30. However, this may be changed. For example, the stator windings 30 may be heated in a heating device (air-heating furnace), or the stator windings 30 may be heated by electromagnetic heating.

In the embodiment described above, the varnish having the relative high glass transition temperature and the powder resin having the relatively low glass transition temperature are used, and the varnish is used as the first resin material (the first electrical insulation resin), and the powder resin is used as the second resin material (the second electrical insulation resin). However, this may be changed. In a case of using another type of powder resin having a relatively high glass transition temperature and another type of varnish having a relatively low glass transition temperature, the powder resin may be used as the first resin material (the first electrical insulation resin), and the varnish may be used as the second resin material (the second electrical insulation resin). In this case, the first insulation layer (corresponding to, for example, the second covering portion 62 in FIG. 4) may be formed with the powder resin, which is the first electrical insulation resin, in the pre-process, and the second insulation layer (corresponding to, for example, the first covering portion 61 in FIG. 4) may be formed with the varnish, which is the second electrical insulation resin, in the post-process.

The combination of the two electrical insulation resins is not limited to the varnish and the powder resin. For example, two types of varnishes, which respectively have different glass transition temperatures, may be used as the two electrical insulation resins, or two types of powder resins, which respectively have different glass transition temperatures, may be used as the two electrical insulation resins.

The insulation layers may be formed at the stator 13 by using three types of electrical insulation resins. In this case, among the three types of electrical insulation resins, at least two types of electrical insulation resins may respectively have different glass transition temperatures. Even in this case, like in the above-described case, after forming one insulation layer with the electrical insulation resin having the higher glass transition temperature, the other insulation layer may be formed with the electrical insulation resin having the lower glass transition temperature.

In the embodiment described above, the stator windings 30 having the segment structure is used at the stator 13. However, the present disclosure is not limited to this. For example, stator windings having a structure other than the segment structure may be used at the stator 13.

Furthermore, the temperature of the stator windings 30 in the process S3 shown in FIG. 5 may be kept to a constant temperature higher than the glass transition temperature of the first resin material by maintaining the energization of the stator windings 30 in the process S3 to cure the first resin material at the constant temperature higher than the glass transition temperature of the first resin material. Likewise, the temperature of the stator windings 30 in the process S5 shown in FIG. 5 may be kept to a constant temperature higher than the glass transition temperature of the second resin material to cure the second resin material at the constant temperature higher than the glass transition temperature of the second resin material.

What is claimed is:

1. A manufacturing method of a stator that includes a plurality of conductor wires wound to form a plurality of windings, the manufacturing method comprising:
a first process that includes:
coating a first electrical insulation resin to the plurality of windings;
then curing the first electrical insulation resin at a temperature or temperatures higher than a glass transition temperature of the first electrical insulation resin; and
thereby forming a first insulation layer made of the first electrical insulation resin at each of the plurality of windings; and
a second process that includes:
coating a second electrical insulation resin to the plurality of windings after the first process;
then curing the second electrical insulation resin at a temperature or temperatures higher than a glass transition temperature of the second electrical insulation resin; and
thereby forming a second insulation layer made of the second electrical insulation resin at each of the plurality of windings, wherein the glass transition temperature of the first electrical insulation resin is higher than the glass transition temperature of the second electrical insulation resin, wherein the second electrical insulation resin is cured by using remaining heat of the plurality of windings that remains after the first process of the first insulation layer.

2. The manufacturing method according to claim 1, wherein:

the first process includes heating the plurality of windings; and after executing the heating of the plurality of windings and the coating of the first electrical insulation resin to the plurality of windings in the first process, the coating of the second electrical insulation resin to the plurality of windings is executed in the second process in a state where a temperature of the plurality of windings is kept higher than the glass transition temperature of the second electrical insulation resin and enables the curing of the second electrical insulation resin.

3. The manufacturing method according to claim 1, wherein the plurality of windings is placed in a state where a temperature decrease of the plurality of windings is limited by a heat-retaining member after the coating of the first electrical insulation resin to the plurality of windings in the first process.

4. The manufacturing method according to claim 1, wherein in the first process, the coating of the first electrical insulation resin to the plurality of windings is executed while heating the plurality of windings.

* * * * *